United States Patent
Hasushita et al.

[11] Patent Number: 5,701,205
[45] Date of Patent: Dec. 23, 1997

[54] SHIFTABLE LENS SYSTEM

[75] Inventors: Sachio Hasushita; Shuji Yoneyama; Koichi Maruyama; Takayuki Ito, all of Tokyo, Japan

[73] Assignee: Asahi Kogaku Kogyo Kabushiki Kaisha, Tokyo, Japan

[21] Appl. No.: 414,126

[22] Filed: Mar. 30, 1995

Related U.S. Application Data

[62] Division of Ser. No. 355,272, Dec. 12, 1994, Pat. No. 5,539,576, which is a continuation of Ser. No. 825,106, Jan. 24, 1992, abandoned.

[30] Foreign Application Priority Data

Jan. 29, 1991 [JP] Japan ................................. 3-094647
Jan. 29, 1991 [JP] Japan ................................. 3-094648

[51] Int. Cl.⁶ ......................... G02B 15/14; G02B 27/64
[52] U.S. Cl. ..................... 359/691; 359/557; 359/676
[58] Field of Search ............................ 359/691, 554, 359/557

[56] References Cited

U.S. PATENT DOCUMENTS

| | | | |
|---|---|---|---|
| 4,081,812 | 3/1978 | Flother . | |
| 4,183,636 | 1/1980 | Besenmatter et al. | 353/101 |
| 4,525,050 | 6/1985 | Oshashi | 354/195.12 |
| 4,548,488 | 10/1985 | Honda et al. | |
| 4,907,868 | 3/1990 | Kitagishi et al. | |
| 4,927,250 | 5/1990 | Suda . | |
| 4,974,950 | 12/1990 | Yamazaki et al. | 359/557 |
| 5,018,845 | 5/1991 | Yamazaki . | |
| 5,069,537 | 12/1991 | Kitagishi . | |
| 5,168,403 | 12/1992 | Umeda et al. | 359/557 |
| 5,249,079 | 9/1993 | Umeda | 359/557 |

FOREIGN PATENT DOCUMENTS

| | | |
|---|---|---|
| 346107 | 10/1978 | Austria . |
| 1276998 | 9/1968 | Germany . |
| 2855496 | 7/1980 | Germany . |
| 3628480 | 3/1987 | Germany . |
| 61-31282 | 11/1986 | Japan . |
| 2146022 | 6/1990 | Japan . |

*Primary Examiner*—Scott J. Sugarman
*Attorney, Agent, or Firm*—Greenblum & Bernstein P.L.C.

[57] ABSTRACT

A shiftable lens system having front and rear lens groups, wherein a part or the whole of the rear lens group is shiftable in a direction perpendicular to the principal optical axis thereof.

21 Claims, 5 Drawing Sheets

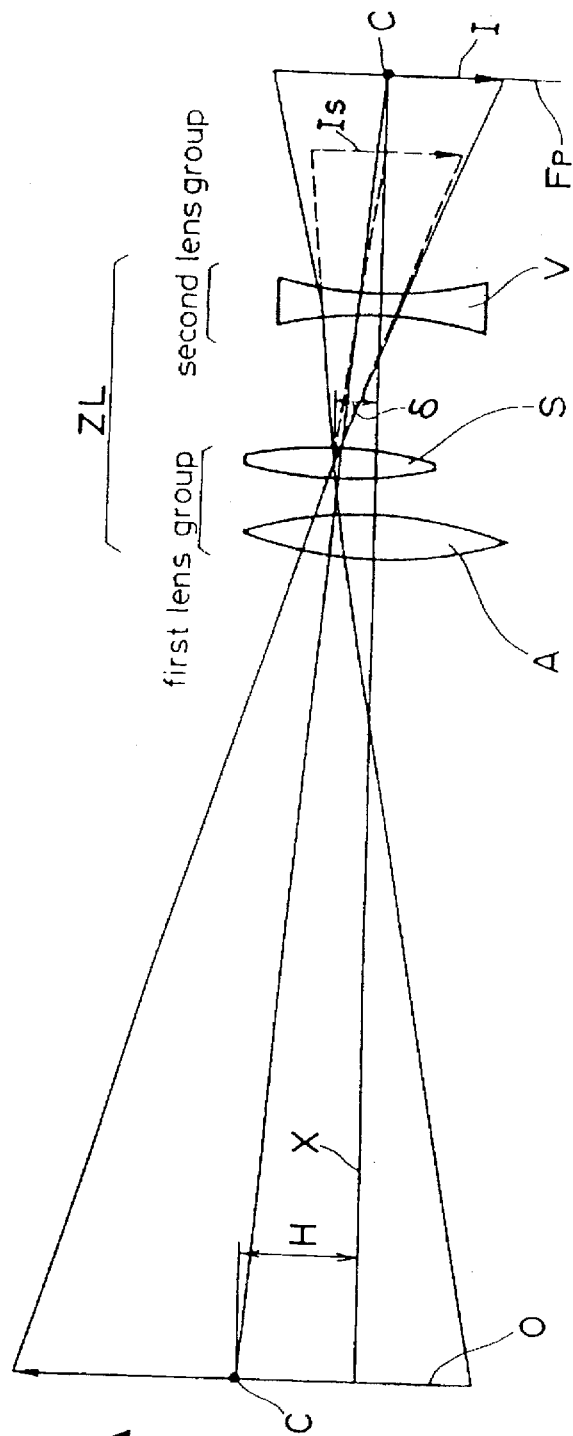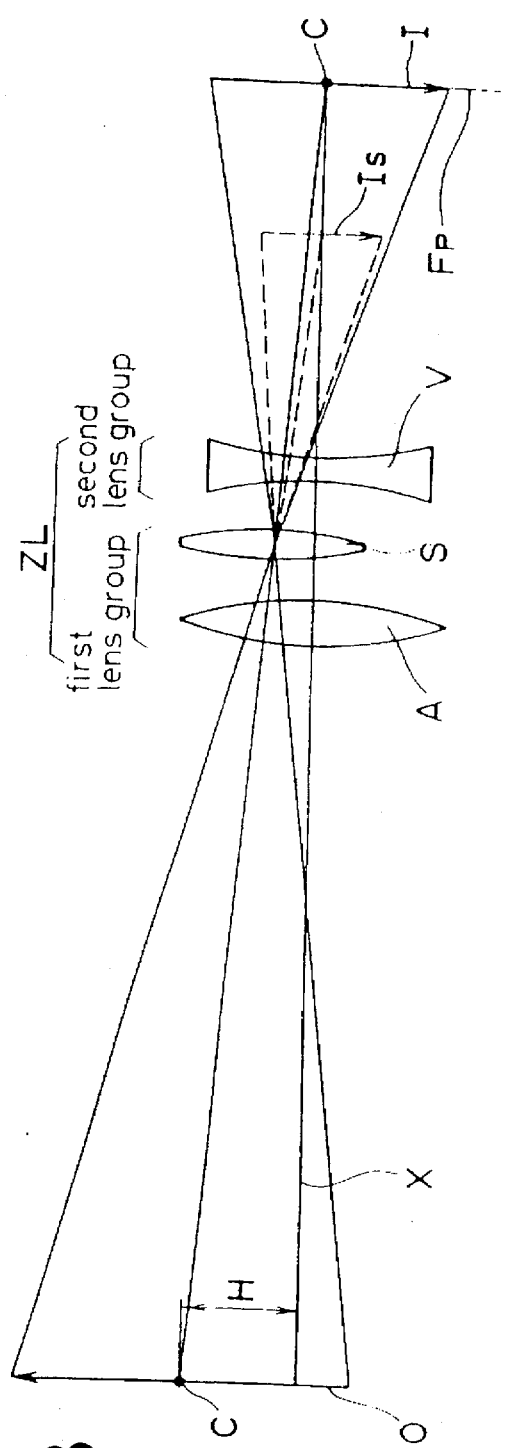

SHIFTABLE LENS SYSTEM

This application is a division of application Ser. No. 08/355,272, filed Dec. 12, 1994, now U.S. Pat. No. 5,539,576 which is a continuation of application Ser. No. 07/825,106, filed Jan. 24, 1992, now abandoned.

BACKGROUND OF THE INVENTION

1. Field of the Invention

The present invention relates to an optical system used in a camera or the like, and more precisely, it relates to a shiftable lens system for varying the range (taking range) of an object to be taken, formed on a picture plane such as a photographic film.

2. Description of Related Art

Upon taking a picture, it is known to intentionally shift the principal optical axis (i.e., an optical axis which passes through the center of a picture plane and is perpendicular thereto) from the center of the picture plane (object to be taken). This is known as shift photographing, where a lens system and/or the image plane are (is) moved from a normal position in which a principal point of the lens system is located on a line connecting the center of the object plane and the center of the picture plane, in a direction perpendicular to the principal optical axis, while maintaining the object plane parallel with the picture plane.

Generally speaking, the photographic film plane is fixed to a camera body, and accordingly, the lens system is moved in the direction perpendicular to the principal optical axis to adjust the shift (displacement).

However, in a known shift photographing mechanism in which the whole lens system is movable or shiftable, it is necessary to provide a large and complex shifting device for moving the whole lens system. In particular, in the case of a wide angle lens which is often and advantageously used in shift photographing and which is usually comprised of relatively large diameter lenses, the whole lens system, to be moved, becomes heavy, and accordingly, a larger shifting device is needed.

To this end, it is known to divide the lens system into front and rear lens groups, of which only the front lens group is shifted to perform the shift photographing. The focusing is then effected by the rear lens group. However, in a known wide angle lens, since the front lens group is made of larger diameter lenses than those of the rear lens group, it is still necessary to use a considerably large shifting device.

Furthermore, since the shiftable lens unit is usually made of a special lens or lenses, it is necessary to prepare a special shiftable lens unit separate from the common lenses, thus resulting in an increased manufacturing cost of the camera system.

Furthermore, to incorporate a shiftable lens system in a zoom lens having a zooming variable power lens group, it is necessary to provide a shifting mechanism for moving the whole lens system, including the variable power lens group, in addition to the driving mechanism for moving the variable power lens group. This makes it difficult to realize a camera that is compact and light.

It should also be noted that if a lens shifting mechanism is incorporated in a camera merely to shift the lens system, the center of an image of an object to be taken would be moved relative to the center of the picture plane during the zooming operation.

SUMMARY OF THE INVENTION

The primary object of the present invention is to provide a shiftable lens system in which it possible to realize a small and simple lens shifting mechanism.

Another object of the present invention is to provide a shiftable lens system which can be attached to an existing master lens system to expand the functions of a camera and reduce the manufacturing cost thereof.

Still another object of the present invention is to provide a shiftable zoom lens system in which, upon shifting the lens unit, there is no movement of an object image relative to a picture plane, even during the zooming operation.

To achieve the object mentioned above, according to the patent invention, there is provided a shiftable lens system having front and rear lens groups, wherein a part or the whole of the rear lens group is shiftable in a direction perpendicular to the principal optical axis thereof.

In an aspect of the present invention, the front lens group is comprised of a master lens system and the rear lens group is comprised of an adaptor lens system provided behind the master lens group in a detachable manner.

In a preferred embodiment, the rear lens group has a lateral magnification larger than 1.

According to another aspect of the present invention, the provision is made to a lens shifting device for moving only a part of the rear lens group in a direction perpendicular to the principal optical axis thereof.

According to still another aspect of the present invention, there is provided a shiftable zoom lens system having at least two lens groups including a variable power lens group which are moved during zooming, wherein a part or the whole of a shiftable lens group, located in front of the variable power lens group, is shiftable in a direction perpendicular to the principal optical axis thereof.

Preferably, the shiftable lens group should be a lens group which prevents the image of an object, to be taken, from moving within a picture plane during zooming.

The present disclosure relates to subject matter contained in Japanese Patent Applications No. 3-94647 and No. 3-94648 (both filed on Jan. 29, 1991) which are expressly incorporated herein by reference in their entirety.

BRIEF DESCRIPTION OF THE DRAWINGS

The invention will be described below in detail with reference to the accompanying drawings, in which.

DESCRIPTION OF THE PREFERRED EMBODIMENTS

Figure 1:
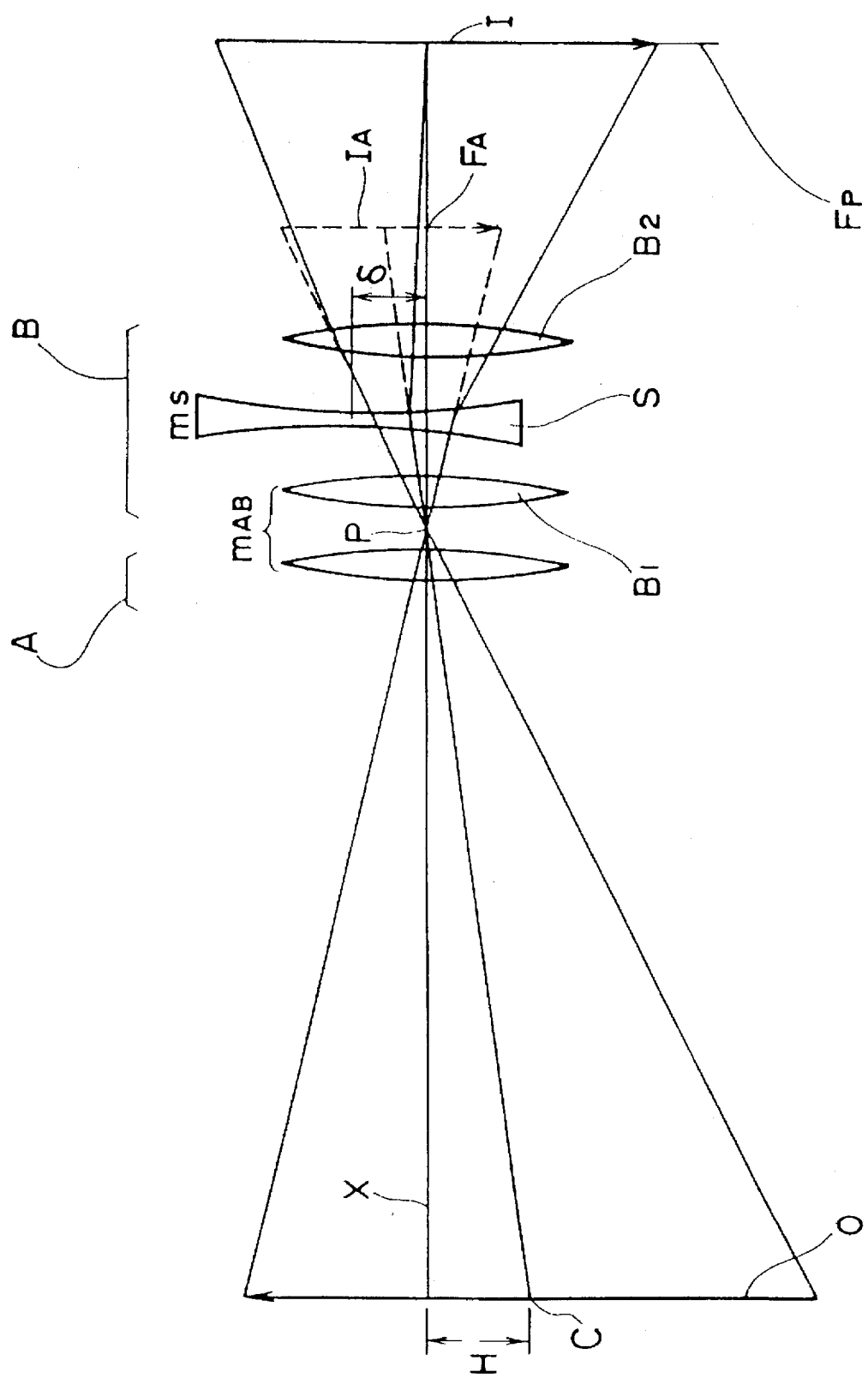
FIG. 1 is a conceptual view of a shiftable lens system according to the present invention.

FIG. 1 shows a basic concept of the present invention, in which an image of an object O, to be taken, is formed on a picture plane $F_p$, such as a photographic film. The lens system is comprised of a master lens system (front lens group A) and an adaptor shift lens system (rear lens group B) provided behind the master lens system A in a detachable manner. The rear lens group B includes a front stationary lens unit B1, a shiftable lens unit S, and a rear stationary lens unit B2, as illustrated in the embodiment. The shiftable lens unit S is movable in a direction perpendicular to the principal optical axis X. The front lens group A together with the front stationary lens unit B1 of the rear lens group B constitute a composite lens system having a principal point P for the formation of an image $I_A$ at the focal point $F_A$. When the shiftable lens unit S is orthogonally shifted (i.e. shifted in a direction perpendicular to the principal optical axis X) at a displacement δ with respect to the principal optical axis X, the rear lens group B forms an image (object image) I of the image $I_A$ on the picture plane $F_p$. In the shifted state, the center of the object image I is located on the principal optical axis X to effect the shift photographing.

Here, the height H (deviation of the center of the object O from the principal optical axis O) is given by the following equation;

$$H=(1-1/m_s) \delta/m_{A \cdot B}$$

wherein "$m_{A \cdot B}$" designates the composite lateral magnification of the master lens group A and the front stationary lens unit B1 of the rear lens group B, and "$m_s$" the lateral magnification of the shiftable lens unit S.

Namely, when the height H and the displacement δ satisfy the equation above, the center of the object image I will be located on the principal optical axis X, so that the object O is in focus.

In the shiftable lens system as constructed above, the image of the object, which is deviated from the principal optical axis X, is formed on the picture plane at a predetermined position thereof by shifting only a part of the rear lens group B of the lens system, i.e., only the shiftable lens unit S, in the direction perpendicular to the principal optical axis X to effect the shift photographing. This enables a smaller and simpler shift mechanism to be realized, as opposed to a conventional shift mechanism in which the front lens group or even the whole lens system is moved, i.e., a master lens system having a large diameter (aperture) or the like.

Furthermore, since the rear lens group B is made of a detachable adaptor lens system as illustrated in the embodiment, an existing master lens system can be employed without modification to realize the shiftable lens system, resulting in an inexpensive camera system.

Figure 2:
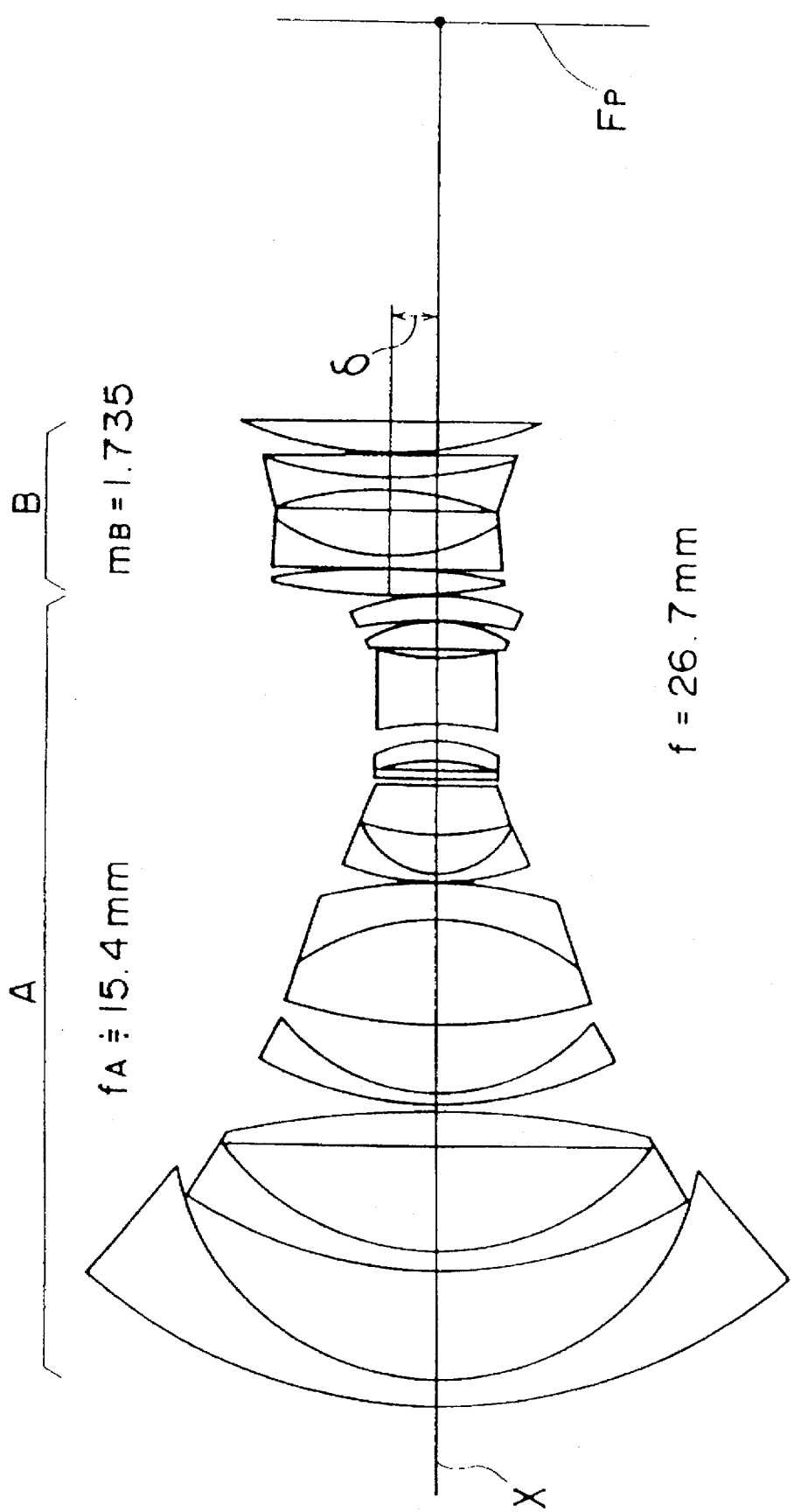
FIG. 2 is a schematic view of constituent optical elements of a shiftable lens system, according to a first embodiment of the present invention.

FIG. 2 shows a more concrete arrangement of the optical elements of the shiftable lens system according to the present invention.

In the arrangement shown in FIG. 2, the front lens group A is constituted by a master lens system having a wide angle lens unit with focal length $f_A$ of 15.4 mm ($f_A$=15.4 mm). The rear lens group B located behind the front lens group A is constituted by a detachable and shiftable adaptor lens system which is wholly movable in the direction perpendicular to the principal optical axis X. The lateral magnification $m_B$ of the adaptor lens system B is 1.735 ($m_B$=1.735). The focal length f of the whole shiftable lens system, when the adaptor lens system is attached, is 26.7 mm (f=26.7 mm). In this arrangement, when the adaptor lens system B is moved by a displacement (shift) δ in the direction perpendicular to the principal optical axis X, the object image I can be converged onto the picture plane $F_p$, in accordance with the aforementioned equation.

If the size of the photograph image area of the picture plane is restricted, the maximum half-angle of view of the whole lens system, including the adaptor lens system B attached to the master lens system A when the adaptor lens system B is shifted, must be smaller than the half-angle of view of the master lens system A to ensure that the light rays within the maximum half-angle of view, when the adaptor lens system B is shifted, are all made incident upon the limited size of the picture plane. To this end, the lateral magnification of the adaptor lens system B must be greater than 1. Namely, it is necessary to increase and decrease the focal length and the half-angle of view, respectively.

For example, if the maximum height y of the object image is 21.6 mm (y=21.6 mm), the half-angle $\omega_M$ of view of the master lens system A is nearly equal to 55° ($\omega_M \approx 55°$), and the half-angle $\omega_0$ of view of the whole lens system when the shift is zero (δ=0) is nearly equal to 39° ($\omega_0 \approx 39°$), the maximum value ω of the half-angle of view of the composite lens system, when the adaptor lens system is shifted, can then obtained by using the following formula:

$$\tan\omega = [y+(m_B-1)\delta]/m_B f_A$$

(i.e. if δ=5, then ω≈44°).

In theory, it is possible to shift the adaptor lens system until the half-angle of view of the whole lens system (composite lens system) is identical to that of the master lens system. However, the shift (displacement) may be restricted by the diameter of the adaptor lens system. If the picture plane is not restricted in size, it is possible for the lateral magnification to be less than 1.

As can be seen from the above discussion, since the shiftable lens unit is included in the rear lens group in the shiftable lens system of the present invention, the shiftable lens unit can be driven by a small and light shifting mechanism even in a camera with a wide angle lens having a large diameter. Consequently, a small and light camera can be realized.

Furthermore, since the rear lens group is made of a detachable adaptor lens unit, it can be attached to an existing master lens system to realize a shiftable lens system, thus resulting in an expansion of the camera system's functions and a reduction of the manufacturing cost thereof.

Figure 3A:
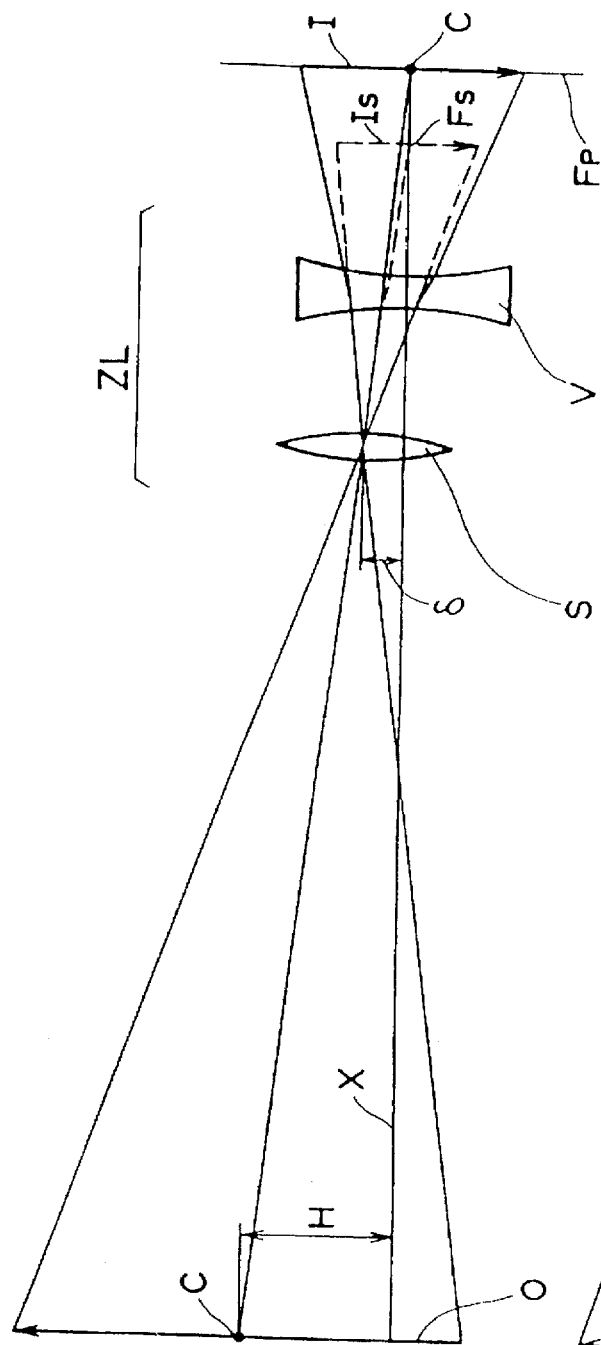
FIGS. 3A and 3B are schematic views of a thin lens unit of a shiftable zoom lens system on short and long focal length sides, according to a second embodiment of the present invention, respectively.
Figure 3B:
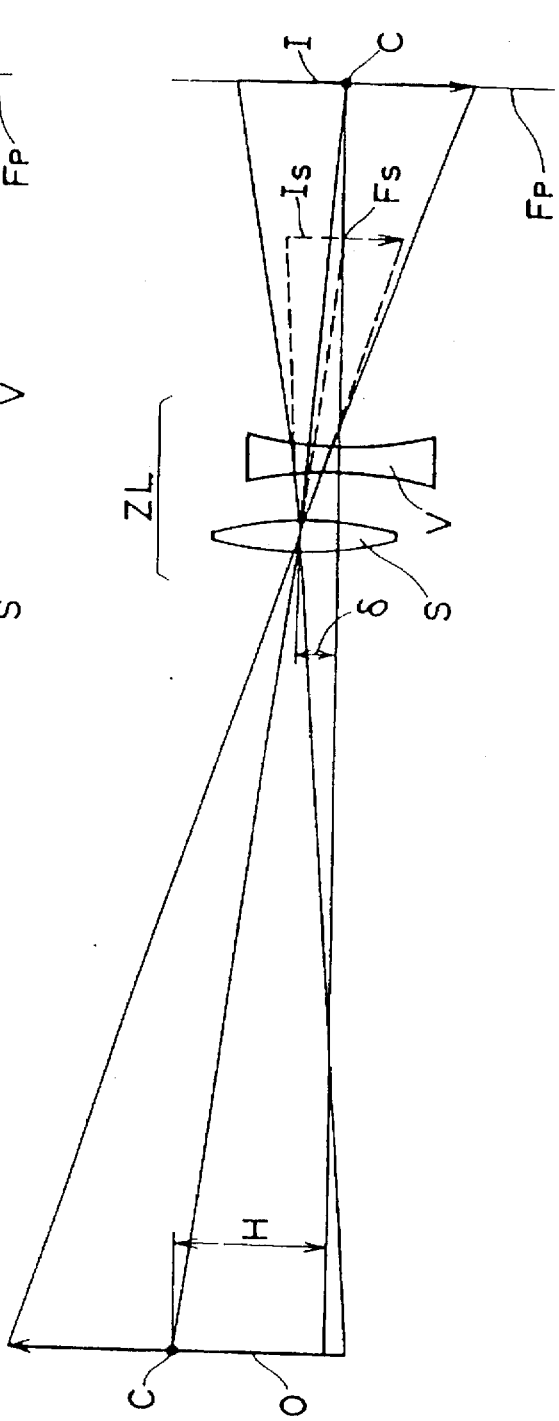

FIGS. 3A and 3B show a second embodiment of the present invention which is applied to a zoom lens system. The shiftable zoom lens system, as illustrated in FIGS. 3A and 3B is comprised of a thin lens system. FIGS. 3A and 3B show the shiftable zoom lens system on the short and long focal length sides, respectively.

In FIGS. 3A and 3B, the zoom lens system ZL is provided between the object O, to be taken, and the picture plane $F_p$ corresponding to a photographic film in a camera. The zoom lens system ZL is comprised of a first lens group, shiftable lens unit S, and a second lens group, variable power lens unit V. The first lens group (shiftable lens unit S) is movable in a direction perpendicular to the principal optical axis X of the zoom lens system ZL. The second lens group (variable power lens unit) V is reciprocally movable along the principal optical axis X. The movement of the variable power lens unit V causes the shiftable lens unit S to move in the same direction, thereby varying the focal length of the whole zoom lens system ZL and effecting the zooming operation.

When the center C of the object O is deviated from the principal optical axis X by an amount of deviation (height) H, the shiftable lens unit S is correspondingly displaced by an amount of deviation (shift) δ from the principal axis X to form the image I, at the focal point $F_S$ of the shiftable lens unit S. The center of the image $I_S$ is moved onto the principal axis X by adjusting the shift δ. Namely, the height H is given by H=δ/$m_s$, wherein "$m_s$" designates the lateral magnification of the shiftable lens unit S. When the distance between the object O and the shiftable lens unit S is substantially larger than the focal length $f_S$ of the shiftable lens unit S, even if the shiftable lens unit S is slightly moved along the principal axis X, the lateral magnification $m_s$ is kept substantially constant. As a result, the height H is constant so long as the shift δ of the shiftable lens unit S is kept constant. Consequently, when the image $I_S$ is focused on the picture plane $F_P$ as an object image I by the variable power lens unit V, the center of the object image I is located at the center of the picture plane $F_P$. As the focus position is maintained when the variable power lens unit V together with the shiftable lens unit S are moved along the principal axis X, no movement of the image takes place on the picture plane, even during zooming.

Figures 4A, 4B:
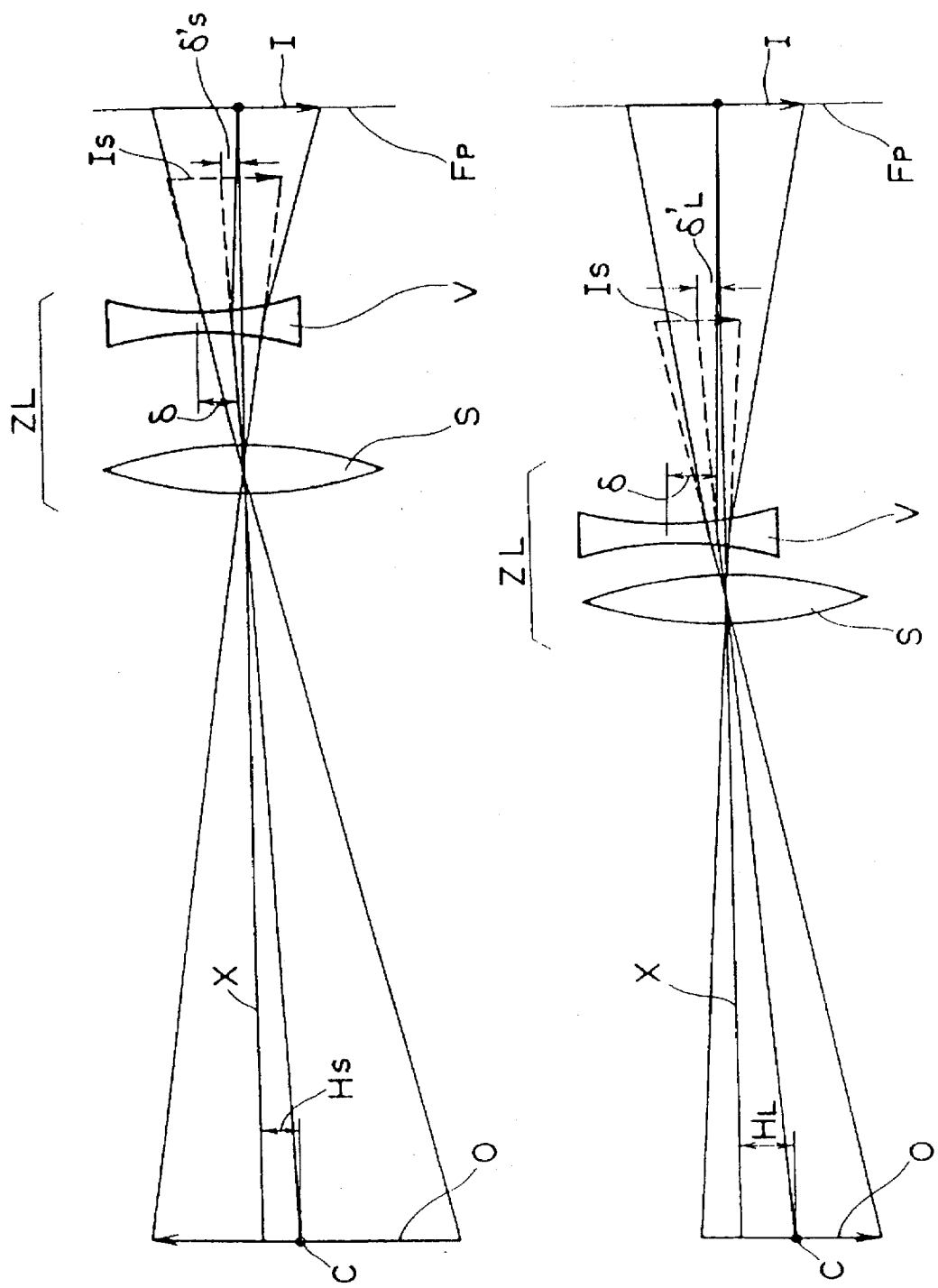
FIGS. 4A and 4B are schematic views similar to FIGS. 3A and 3B, but showing a comparative example of a thin lens unit; and, FIGS. 5A and 5B are schematic views of a thin lens unit of a shiftable zoom lens system on short and long focal length sides, according to a third embodiment of the present invention, respectively.

FIGS. 4A and 4B show a comparative example of a thin lens system similar to FIGS. 3A and 3B, on the short and long focal point sides, respectively, when the variable power lens unit V is shifted.

When the variable power lens unit V is shifted, as shown in FIGS. 4A and 4B, the height H of the object O is given by;

$$H = \delta'/m_s = (1 - 1/m_v) \, \delta/m_s,$$

wherein $m_s = \delta'/H$; $m_v = \delta/(\delta - \delta')$

In FIGS. 4A and 4B, "δS'" and "δL'" designate deviations (heights) of the center of the image $I_S$ from the principal axis X when the variable power lens unit V is shifted by the displacement δ at the short focal point and the long focal point, respectively. Also in FIGS. 4A and 4B, "$H_S$" and "$H_L$" represent the deviations (heights) of the center C of object O from the principal axis X, at the short focal point and the long focal point, respectively.

Here, since $m_v = f/f_S$, the value of $m_v$ largely varies during zooming. Consequently, when the variable power lens unit V is moved whale maintaining the shift δ thereof constant during zooming, the height H ($H_S$, $H_L$) of the center C of the object O from the principal axis X varies. Thus, the object image I is moved in the picture plane $F_P$ during zooming. However, movement of the object image is undesirable and should be avoided.

FIGS. 5A and 5B show a modification of a thin lens system of FIGS. 3A and 3B, in which the zoom lens system ZL is comprised of a first lens group and a second lens group. FIGS. 5A and 5B show the short and long focal length sides, respectively. In the illustrated embodiment, the first lens group is made of a plurality of lens units including a stationary lens unit A and a shiftable lens unit S which can be shifted in the direction perpendicular to the principal axis X. The second lens group is made of a variable power lens unit V which is movable in the direction of the principal axis X to effect the zooming operation. In the zoom lens system, as illustrated in FIGS. 5A and 5B, when the shiftable lens unit S, which constitutes a part of the first lens unit located in front of the variable power lens unit V, is shifted in the direction perpendicular to the principal axis X, the object image I is focused on the picture plane $F_P$ at the center thereof. Even during zooming by the variable power lens unit V, the object image I can be kept in focus.

The deviation (height) H of the center C of object O from the principal axis X is obtained by the following equation:

$$H = (1 - 1/m_s) \delta/m_A,$$

wherein "$m_s$" and "$m_A$" denote the lateral magnification of the shiftable lens unit S and the lateral magnification of the stationary lens unit A, respectively.

When the distances from the shiftable lens unit S and the stationary lens unit A to the object O are larger than the focal lengths thereof, the lateral magnifications $m_s$ and $m_A$ are substantially constant. Accordingly the height H is also substantially constant. Consequently, there is no movement of the object image I in the picture plane $F_P$, even when the variable power lens unit V is moved to effect the zooming operation.

As can be understood from the above discussion, according to the present invention, since the shift photographing can be carried out by shifting only a part of the front lens group, located in front of the variable power lens group, in the direction perpendicular to the principal optical axis, without shifting the whole zoom lens system, the shifting device can be miniaturized and its weight decreased. Furthermore, there is no movement of the object image within the picture plane in order to maintain the focused state, even during zooming.

We claim:

1. A shiftable zoom lens system for performing shift photography, the lens system having at least two lens groups including a variable power lens group, which are moved during zooming, wherein at least a part of a shiftable lens group located in front of said variable power lens group is shiftable in a direction perpendicular to a principal optical axis thereof so that an object to be photographed, having a center deviated from the principal optical axis of said variable power lens group, can be formed on a film plane with an image center that is positioned on the principal optical axis of said variable power lens group.

2. A shiftable zoom lens system according to claim 1, wherein said shiftable lens group is a lens group which prevents movement of the image of an object to be taken within a picture plane during zooming.

3. The shiftable zoom lens system according to claim 1, said shiftable lens group being shiftable to a predetermined position prior to actuation of an image forming operation.

4. The shiftable zoom lens system according to claim 1, an object to be photographed is displaced by a distance H from the optical axis, wherein H is defined by the following relationship:

$$H = \delta/m_s$$

wherein δ represents a displacement amount of the shiftable lens group and $m_s$ represents a lateral magnification of the shiftable lens group.

5. The shiftable lens system according to claim 1, movement of said at least a part of said shiftable lens group being in accordance with deviation of the center of an object to be photographed from the principal optical axis of said variable power lens group.

6. The shiftable zoom lens system for performing shift photography according to claim 1, said lens system including at least one lens positioned in front of said shiftable lens group, said at least one lens being non-shiftable in the direction perpendicular to the principal optical axis.

7. A zoom lens system for performing shift photography, the lens system having at least two lens groups including a variable power lens group, which are moved during zooming, wherein at least a part of a shiftable lens group located in front of said variable power lens group is shiftable in a direction perpendicular to a principal optical axis thereof to compensate for deviation, with respect to the zoom lens system, of a center of an object to be photographed from a principal optical axis of said variable power lens group.

8. The zoom lens system for shift photography according to claim 7, said shiftable lens group being shiftable to a predetermined position prior to actuation of an image forming operation.

9. The zoom lens system for shift photography according to claim 7, an object to be photographed is displaced by a distance H, wherein H is defined by the following relationship:

$$H=\delta/m_s$$

wherein δ represents a displacement amount of the shiftable lens group and $m_s$ represents a lateral magnification of the shiftable lens group.

10. The shiftable lens system according to claim 7, movement of said at least a part of said shiftable lens group being in accordance with deviation of the center of an object to be photographed from the principal optical axis of said variable power lens group.

11. The zoom lens system for performing shift photography according to claim 7, said lens system including at least one lens positioned in front of said shiftable lens group, said at least one lens being non-shiftable in the direction perpendicular to the principal optical axis.

12. A shiftable zoom lens system for performing shift photography, the lens system having at least two lens groups including a variable power lens group, which are moved during zooming, wherein at least a part of a shiftable lens group located in front of said variable power lens group is shiftable, prior to commencement of an image forming photographing operation, in a direction perpendicular to a principal optical axis of the variable power lens group, so that an object to be photographed, having a center deviated from the principal optical axis of said variable power lens group, can be formed on a film plane with an image center that is positioned on the principal optical axis of said variable power lens group.

13. The shiftable zoom lens system according to claim 12, said at least a part of said shiftable lens group being shiftable to a predetermined position independently of an image forming photographing operation.

14. The shiftable zoom lens system according to claim 12, an object to be photographed is displaced by a distance H from the optical axis, wherein H is defined by the following relationship:

$$H=\delta/m_s$$

wherein δ represents a displacement amount of the shiftable lens group and $m_s$ represents a lateral magnification of the shiftable lens group.

15. The shiftable lens system according to claim 12, movement of said at least a part of said shiftable lens group being in accordance with deviation of the center of an object to be photographed from the principal optical axis of said variable power lens group.

16. The shiftable zoom lens system for performing shift photography according to claim 12, said lens system including at least one lens positioned in front of said shiftable lens group, said at least one lens being non-shiftable in the direction perpendicular to the principal optical axis.

17. A zoom lens system for performing shift photography, the lens system having at least two lens groups including a variable power lens group, which are moved during zooming, wherein at least a part of a shiftable lens group located in front of said variable power lens group is shiftable, prior to commencement of an image forming photographing operation, in a direction perpendicular to a principal optical axis of said variable power lens group to compensate for deviation of a center of an object to be photographed from the principal optical axis of said variable power lens group.

18. The zoom lens system for shift photography according to claim 17, said at least a part of said shiftable lens group being shiftable to a predetermined position independently of an image forming photographing operation.

19. The zoom lens system for shift photography according to claim 17, an object to be photographed is displaced by a distance H, wherein H is defined by the following relationship:

$$H=\delta/m_s$$

wherein δ represents a displacement amount of the shiftable lens group and $m_s$ represents a lateral magnification of the shiftable lens group.

20. The shiftable lens system according to claim 17, movement of said at least a part of said shiftable lens group being in accordance with deviation of the center of an object to be photographed from the principal optical axis of said variable power lens group.

21. The zoom lens system for performing shift photography according to claim 17, said lens system including at least one lens positioned in front of said shiftable lens group, said at least one lens being non-shiftable in the direction perpendicular to the principal optical axis of said variable power lens group.

* * * * *